Oct. 14, 1952 — J. C. TELLIER — 2,614,216

SUPERREGENERATIVE DETECTOR

Filed Sept. 8, 1949

INVENTOR.
JOSEPH C. TELLIER
BY
Brown, Denk & Synnestvedt
AGENTS

Patented Oct. 14, 1952

2,614,216

UNITED STATES PATENT OFFICE 2,614,216

SUPERREGENERATIVE DETECTOR

Joseph C. Tellier, Penn Wynne, Pa., assignor to Philco Corporation, Philadelphia, Pa., a corporation of Pennsylvania Application September 8, 1949, Serial No. 114,623

9 Claims. (Cl. 250—27)

The present invention relates to superregenerative frequency-modulation detectors.

In accordance with my invention, superregenerative oscillators, or superregenerators, as they are commonly called, are employed in a novel manner in the detection of frequency-modulated signals. The frequency-modulated signal to be detected is applied simultaneously to a pair of superrengerators which are tuned to the same operating frequency and simultaneously quenched and simultaneously unquenched at the same, preferably superauditory, rate. The signal is applied to the superregenerators by way of a phase-splitting device which is effective to shift the phase of the signal applied to one of the superregenerators relative to that of the signal applied to the other superregenerator. For example, at center frequency, the two applied signals may be in quadrature. Frequency variations in the incoming signal produce variations in the phase difference between the signals applied to the two superregenerators and, as a result thereof, also in the phase relationships of the oscillations developed in the superregenerator tank circuits. The tank-circuit voltages are additively combined and then peak detected to provide an output signal the amplitude of which varies in accordance with the phase difference between the tank-circuit oscillations and hence in accordance with the frequency deviation of the incoming signal.

My new superregenerative frequency-modulation detector, briefly described above, is substantially insensitive to any amplitude variation which may occur in the incoming frequency-modulated signals, as will become evident hereinafter.

An important object of my invention is to provide an inexpensive superregenerative frequency-modulation detector having good noise rejection at low signal strength.

This object, as well as other objects, features and advantages of my invention will become clear from a consideration of the subsequent detailed discussion taken in conjunction with the accompanying drawing wherein.

Figure 1:
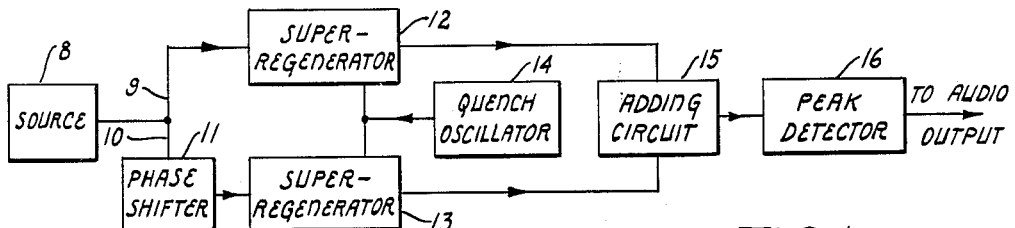
Figure 1 is a diagrammatic representative of a system embodying my invention.

Referring now to Figure 1, there is illustrated, in block diagram, a source 8 of frequency-modulated carrier wave, a path 9 coupling source 8 to superregenerator 12 and a separate path 10 coupling source 8 to superrengenerator 13 by way of phase shifter 11. A quench oscillator 14 is provided for simultaneously quenching and simultaneously unquenching the superregenerators 12 and 13. An adding circuit 15 and a peak detector 16 are provided respectively to combine and detect the signals derived from the superregenerators 12 and 13, as will be described in more detail hereinafter.

The operation of the system shown diagrammatically in Figure 1 may be briefly described as follows: Quench oscillator 14 quenches and unquenches superregenerators 12 and 13 simultaneously at a predetermined, preferably superauditory, rate. Whenever the superregenerators are unquenched, the frequency-modulated carrier signals applied thereto from source 8 cause oscillations to build up in the tank circuits of the superregenerators 12, 13 in well known superregenerative manner. These oscillations build up to the overload or equilibrium value, and this level is then maintained until the quench oscillator 14 acts to quench the superregenerators. Phase-shifting device 11 so operates that the amount of phase shift which it introduces into the frequency-modulated carrier signal prior to its application to superregenerator 13 is a function of the instantaneous frequency of the carrier signal. For example, device 11 may be so arranged that at center frequency the device will shift the phase of the signal by 90°, a frequency deviation in one direction from center frequency increasing the phase shift, and a frequency deviation in the other direction decreasing the phase shift.

Figure 2:
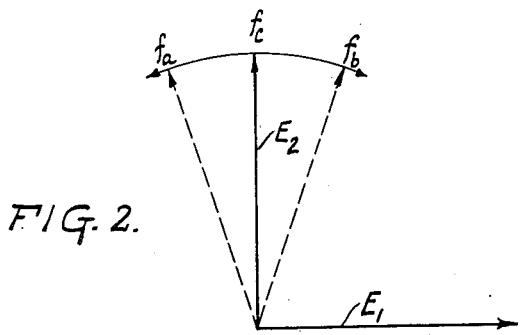
Figure 2 is a graphical representation which will be helpful in explaining the operation of my new superregenerative detector.

The above is illustrated in Figure 2 where vector $E_1$ represents the phase of the signal applied to superregenerator 12 and vector $E_2$ represents the phase, at center frequency, of the signal applied to superregenerator 13. Observe that at center frequency the signals applied to the two superregenerators are in quadrature. For frequencies other than center frequency vector $E_2$ moves between the dotted-line positions $f_a$ and $f_b$ corresponding respectively to frequencies above and below center frequency. At these frequencies the phase relationships between the two applied signals are either greater than, or less than, 90°. It is to be understood that a phase shift of 90° at center frequency is not essential to the invention, and that other values of phase angle, at center frequency, may be quite satisfactory.

In accordance with my invention, the tank circuits of the superregenerators are both tuned to the same frequency, preferably to the center frequency of the applied frequency-modulated signal, and, as previously indicated, both superregenerators are simultaneously quenched and simultaneously unquenched. The circuit parameters of the two superregenerators are substantially identical and both superregenerators develop tank voltages of equal peak amplitude and equal frequency. However, because of the action of phase-shifter 11, there will be a phase displacement between the tank voltages of the two superregenerators, the magnitude of the phase displacement, as indicated above, being a function of the frequency of the applied signal.

As is known, the peak amplitude of the voltage developed in the tank circuit of a superregenerator is determined by the overload or equilibrium level and is independent of the amplitude of the applied signal. Furthermore, the operating frequency of a superregenerator is determined by the tuning of its tank circuit and is independent of the frequency of the applied signal. Consequently, in the system of Figure 1, the frequency and peak amplitude of the output signals of the two superregenerators 12 and 13 do not change when the applied signal deviates from center frequency. The phases, however, of the output signals relative to each other do change as the frequency of the applied signal deviates from center frequency.

It will be seen then that when the output signals of the two superregenerators 12, 13 are combined in adding device 15 the peak amplitude of the resultant signal will vary as a function of the relative phases of the component signals, which in turn vary as a function of the frequency deviation of the applied signal. Peak detection of the combined signal therefore yields a unidirectional output signal whose magnitude is dependent upon the frequency of the applied signal, thus effecting the desired detection of the incoming frequency-modulated signal.

A more detailed showing of a superregenerative frequency-modulation detector which embodies a preferred form of my invention, as hereinabove generally described, is given in Figure 3. As shown therein, the source of frequency-modulated carrier wave may comprise the plate circuit of a conventional converter tube 17. The output signal from converter 17 is applied to the tank circuits 18, 19 of a pair of superregenerators 25, 26 by inductive coupling, the inductor of each tank circuit constituting the secondary winding of one of a pair of transformers 27, 28 the primaries of which are connected in the plate circuit of tube 17. In the preferred embodiment, the primary windings are serially connected in order to insure that the same signal is applied to the input elements of the two tank circuits 18, 19. The primary winding of transformer 27 is untuned and preferably tightly coupled to the secondary. The signal voltage developed across the tank circuit 18 at the center-frequency of the signal is of course, substantially in phase with that across the primary. The primary winding of transformer 28, on the other hand, is tuned, being tuned to the center frequency. The signal voltage developed across the primary winding of transformer 28 is, therefore in phase with that developed across the primary winding of transformer 27. Since the voltage developed across tank circuit 19 is in quadrature with the voltage developed across the primary winding of transformer 28, the voltage developed across tank 19 is also in quadrature with the voltage developed across tank 18, at center frequency. The primary winding of transformer 28 is so coupled to its secondary as to maintain the phase characteristic of transformer 28 as linear as possible over the range of frequencies to be covered.

When the frequency of the applied signal deviates from center frequency, a very small change occurs in the phase of the voltage developed across tank 18, while a relatively large phase change occurs in the voltage developed across tank 19, thus changing the phase relationship of the voltages developed across the two tank circuits with respect to each other. The phase relationship between the developed voltages is then no longer 90°, as it was at center frequency. A frequency deviation to one side of center frequency produces a phase relationship greater than 90°, while a frequency deviation to the other side of center frequency produces a phase difference of less than 90°. In either case, the magnitude of the phase difference between the voltages developed across tanks 18 and 19 is a function of the magnitude and direction of the frequency deviation from center frequency. By making the bandwidths of the inductive coupling arrangements at least equal to the anticipated peak-to-peak frequency deviation, the phase departure caused by a frequency deviation of the applied signal may be limited to a maximum of 45° on either side of the center-frequency phase position. The phase difference between voltages developed across the two tank circuits will thus vary between limits of 45° and 135°.

The tank circuits 18, 19 are connected in conventional manner to the respective grids of a pair of triodes, as shown, and the plates of the triodes are joined together and connected in conventional manner to a quench oscillator 20. The quench oscillator may be any one of several conventional types. Moreover, the quench oscillator need not be a separate device, and the superregenerators may, if desired, be self-quenched in known manner, provided they be quenched and unquenched in synchronism.

As previously indicated, quench oscillator 20 renders the two superregenerators simultaneously sensitive and simultaneously insensitive at a predetermined quench frequency. The voltages induced in tank circuits 18, 19 by the currents flowing in the primaries of transformers 27, 28 lose control over the tank oscillations soon after the latter begin to build up, following unquenching, and the tank oscillations build up at the frequency to which the tank circuits are tuned, namely, the center frequency. The phase of the oscillations is controlled, however, by the phase of the signals initially induced at the instant of unquenching, and this phase is maintained until the superregenerators are again unquenched.

Figure 3:
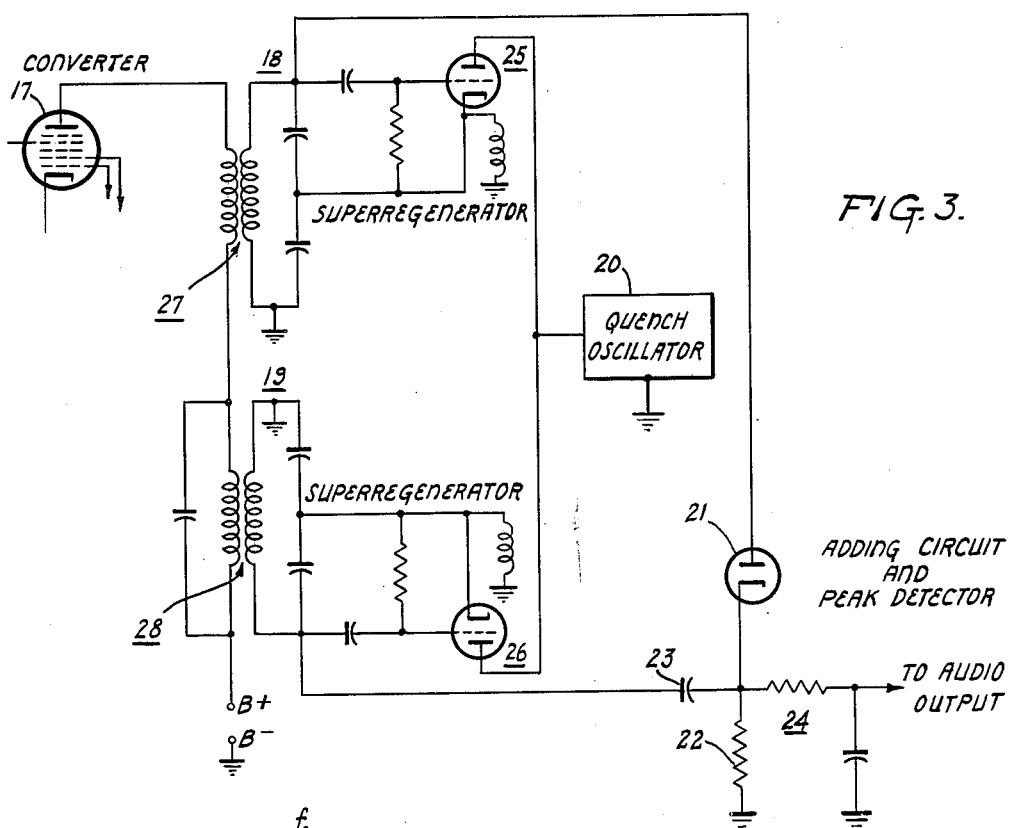
Figure 3 is a schematic representation of a preferred embodiment of my invention showing some of the details which, for purposes of simplification, were omitted from Figure 1.

The functions of the adding circuit and peak detector previously described in general terms, in connection with Figure 1 are, in Figure 3, combined and performed by the diode 21 and the R. C. network 22—23 associated therewith. The time constant of the R. C. network 22—23 is made at least large enough to prevent any substantial ripple from appearing in the voltage developed across resistor 22 due to the intervals during which both superregenerators are quenched, and is preferably made as large as possible without distorting the audio output developed across the resistor. To prevent any remnants of carrier-frequency signals from reaching the audio output of the system, low-pass filter 24 is connected between the R. C. network and the output connection.

It will be seen that my novel superregenerative frequency-modulation detector is substantially insensitive to amplitude variations in the carrier signal since the tank oscillations of the superregenerators always build up to a constant overload amplitude regardless of the amplitude variations of the initiating signal. Thus noise, which takes the form of amplitude modulation of the frequency-modulated signal, is rejected by my novel arrangement. Stated another way, the peak detector operates to detect variations in the peak amplitude of a resultant signal whose components are signals of constant peak amplitude but varying phase.

Although the present invention has been described in a specific embodiment, it will be understood that the inventive concept is capable of other forms of physical expression, and, consequently, my invention is not to be limited to the specific disclosure but only by the scope of the appended claims.

Having described my invention, I claim:

1. In a frequency-modulation receiving system; a first superregenerative amplifier and a second superregenerative amplifier, said first and second amplifiers being tuned to a predetermined common carrier frequency, and quenching means for simultaneously quenching and simultaneously unquenching said first and second amplifiers; a source of frequency-modulated carrier wave; means coupling said source to said first superregenerative amplifier and means coupling said source to said second superregenerative amplifier, at least one of said coupling means including a phase-shifting device whereby the phase of the carrier wave applied to said first amplifier is different from that applied to said second amplifier and the magnitude of said phase difference varies as a function of the frequency of said carrier wave; means for combining the output voltages developed by said first and second amplifiers; and means for peak detecting the resultant voltage.

2. In a frequency-modulation receiving system; a pair of superregenerative amplifiers the input tank circuits of which are tuned to a predetermined common carrier frequency, and means for simultaneously quenching and simultaneously unquenching said superregenerative amplifiers; a source of frequency-modulated carrier wave; means for applying said carrier wave to said tank circuits by way of means effective to produce a phase difference between the carrier wave applied to one of said tank circuits with respect to that applied to the other, the magnitude of said phase difference being a function of the frequency of said carrier wave; means for combining the voltages developed across said tank circuits; and means for peak detecting the resultant voltage.

3. The combination claimed in claim 2 characterized in that the said common frequency to which said tank circuits are tuned is the center frequency of the frequency-modulated carrier wave, and in that the said means effective to produce a phase difference between the carrier wave applied to one of said tank circuits with respect to that applied to the other produces a phase difference therebetween of substantially ninety degrees when the said carrier wave is at center frequency.

4. In a frequency-modulation receiving system; a pair of substantially similar superregenerative amplifiers the input tank circuits of which are tuned to a predetermined common carrier frequency, and means operatively associated therewith for simultaneously quenching and simultaneously unquenching said superregenerative amplifiers; a source of frequency-modulated carrier wave; means for applying said carrier wave to said tank circuits by way of phase-shifting means effective to produce a phase difference between the carrier wave applied to one of said tank circuits with respect to that applied to the other, the magnitude of said phase difference varying as a function of the frequency of said carrier wave; means for combining the voltages developed across said tank circuits; and means for detecting the peak amplitude of the resultant voltage.

5. In a frequency-modulation receiving system; a source of frequency-modulated carrier wave; a pair of substantially similar superregenerative amplifiers the input tank circuits of which are both tuned to the center frequency of said carrier wave, and quenching means operatively associated therewith for simultaneously quenching and unquenching said superregenerative amplifiers; means for applying said carrier wave to said tank circuits by way of a phase-shifting circuit effective to produce a phase difference between the carrier wave applied to one of said tank circuits with respect to that applied to the other, the magnitude of said phase difference varying as a function of the frequency of said carrier wave and being substantially ninety degrees at said center frequency; means for combining the voltages developed across said tank circuits; and means for detecting the peak amplitude of the resultant voltage.

6. In a frequency-modulation system having a source of frequency-modulated carrier wave: a frequency-modulation detector comprising: a pair of superregenerative amplifiers each having an input tank circuit tuned to the center frequency of said carrier wave; means for simultaneously quenching and simultaneously unquenching said pair of amplifiers; a first path coupling said source to one of said tank circuits and a second path coupling said source to the other of said tank circuits, one of said paths including frequency-sensitive phase-shifting means arranged to shift the phase of the carrier wave passing therethrough by a phase angle which is proportional to the deviation from center frequency of said carrier wave; means for deriving a signal output from each of said amplifiers; means for additively combining said signal outputs; and means for detecting the maximum amplitudes of the combined signal outputs.

7. In a system having a pair of signal waves of equal frequency; means for detecting the instantaneous phase difference between said pair of signal waves said means comprising: a pair of superregenerators having tank circuits tuned to the same predetermined frequency, means for simultaneously quenching and simultaneously unquenching said superregenerators; means for applying one of said signal waves to one of said superregenerators and the other of said signal waves to the other of said superregenerators; means for deriving signals across said tank circuits of said superregenerators; means for additively combining said derived signals; and means for detecting the peak amplitude of said additively combined signals, detected signals proportional to said instantaneous phase difference being developed thereacross.

8. In a frequency-modulation system having a source of frequency-modulated carrier wave; a frequency-modulation detector comprising: a signal-combining circuit; a first path interconnecting said source and said combining circuit, said first path including a first carrier-wave transformer having a primary winding connected to the output of said source and a secondary winding tuned to the center frequency of said carrier wave, a first superregenerative amplifier having a resonant circuit comprised of said tuned secondary winding, and means for connecting the output of said first amplifier to the input of said combining circuit; a second path interconnecting said source and said combining circuit, said second path including a second carrier-wave transformer having primary and secondary windings, said primary winding of said second transformer being connected to the output of said source in series with the primary winding of said first transformer and both of said windings of said second transformer being tuned to the center frequency of said carrier wave, a second superregenerative amplifier having a tank circuit comprised of said tuned secondary winding of said second transformer and means connecting the output of said second amplifier to the input of said combining circuit, said signal-combining circuit being arranged to provide an output signal which is proportional to the sum of the signals applied thereto; and a peak detector connected to said combining circuit and arranged to provide a unidirectional signal whose magnitude is proportional to the amplitude of said sum signal.

9. In a frequency-modulation system having a source of frequency-modulated carrier wave; a frequency-modulation detector comprising: a signal-combining circuit; a first path interconnecting said source and said combining circuit, said first path including a carrier-wave transformer having primary and secondary windings, and a superregenerative amplifier, said primary winding being connected to said source, carrier-wave signals derived from said source being transferred from said primary winding to said secondary winding by virtue of the inductive coupling therebetween, a pair of serially connected capacitors shunting said secondary winding and coacting therewith to form a resonant tank circuit, said tank circuit being tuned to the center frequency of said carrier wave and being connected to said superregenerative amplifier to form the oscillatory tank circuit thereof; a second path interconnecting said source and said combining circuit, said second path comprising a carrier-wave transformer having primary and secondary windings, and a superregenerative amplifier, said primary winding of said second transformer being connected to said source, in series with said primary winding of said first transformer, carrier-wave signals derived from said source being transferred from said primary winding to said secondary winding by virtue of the inductive coupling therebetween, said primary winding and said secondary winding being both tuned to the center frequency of said carrier wave, said tuned secondary winding constituting the oscillatory tank circuit of said superregenerative amplifier; means for applying the output signals of each of said superregenerative amplifiers to said combining circuit for additive combination therein; and a peak detector connected to the output of said combining circuit and operative to produce a unidirectional signal whose magnitude is proportional to the peak amplitude of said additively combined signals.

JOSEPH C. TELLIER.

REFERENCES CITED

The following references are of record in the file of this patent:

UNITED STATES PATENTS

| Number | Name | Date |
| --- | --- | --- |
| 2,095,314 | Conklin | Oct. 12, 1937 |
| 2,212,182 | Paddle | Aug. 20, 1940 |
| 2,230,108 | Gerhard | Jan. 28, 1941 |
| 2,265,744 | Rath | Dec. 9, 1941 |
| 2,351,193 | Crosby | June 13, 1944 |
| 2,363,651 | Crosby | Nov. 28, 1944 |
| 2,513,731 | Loughlin | July 4, 1950 |